United States Patent
Matsumura et al.

(10) Patent No.: US 10,346,070 B2
(45) Date of Patent: Jul. 9, 2019

(54) STORAGE CONTROL APPARATUS AND STORAGE CONTROL METHOD

(71) Applicant: FUJITSU LIMITED, Kawasaki-shi, Kanagawa (JP)

(72) Inventors: Shinichiro Matsumura, Kawasaki (JP); Motohiro Sakai, Nerima (JP); Takahiro Ohyama, Kawasaki (JP); Takuro Kumabe, Kawasaki (JP); Akihito Kobayashi, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 48 days.

(21) Appl. No.: 15/286,927

(22) Filed: Oct. 6, 2016

(65) Prior Publication Data
US 2017/0147244 A1 May 25, 2017

(30) Foreign Application Priority Data

Nov. 19, 2015 (JP) ................................. 2015-226502

(51) Int. Cl.
*G06F 3/06* (2006.01)
*G06F 12/0897* (2016.01)

(52) U.S. Cl.
CPC .......... *G06F 3/0622* (2013.01); *G06F 3/0611* (2013.01); *G06F 3/0655* (2013.01); *G06F 3/0659* (2013.01); *G06F 3/0685* (2013.01); *G06F 3/0689* (2013.01); *G06F 12/0897* (2013.01); *G06F 2212/60* (2013.01)

(58) Field of Classification Search
CPC .... G06F 3/0659; G06F 13/1673; G06F 3/061; G06F 9/4881; G06F 13/1642; G06F 9/3855; G06F 2209/548
See application file for complete search history.

(56) References Cited

U.S. PATENT DOCUMENTS

| | | | | |
|---|---|---|---|---|
| 2003/0065856 A1* | 4/2003 | Kagan | ................... | G06F 13/387 710/263 |
| 2010/0241792 A1* | 9/2010 | Lee | ...................... | G06F 12/0246 711/103 |
| 2013/0326249 A1* | 12/2013 | Navarro | ................ | G06F 1/3268 713/320 |
| 2014/0207995 A1* | 7/2014 | Benhase | ............. | G06F 12/0246 711/102 |
| 2016/0011966 A1 | 1/2016 | Keeler et al. | | |
| 2016/0021186 A1* | 1/2016 | de Sene | .............. | G06F 16/1827 709/213 |
| 2016/0283135 A1* | 9/2016 | Ahmed | ................... | G06F 3/067 |

FOREIGN PATENT DOCUMENTS

JP 04-004422 1/1992
JP 2015-130150 7/2015

* cited by examiner

*Primary Examiner* — Reginald G Bragdon
*Assistant Examiner* — Thanh D Vo
(74) *Attorney, Agent, or Firm* — Fujitsu Patent Center

(57) ABSTRACT

When an access process has been requested for a storage apparatus, a registration unit determines an access priority of the requested access process and registers an entry corresponding to the requested access process in a queue corresponding to the determined access priority out of a plurality of queues that are each provided for a different access priority. An instruction unit checks the plurality of queues at intermittent check timing, fetches, at each check timing, one entry from each queue, out of the plurality of queues, in which entries are registered, and instructs the storage apparatus to execute access processes corresponding to the fetched entries.

7 Claims, 12 Drawing Sheets

124 NUMBER-OF-DIVISIONS CORRESPONDENCE TABLE

| SSD BUSY RATE (%) | 0~19 | 20~39 | 40~59 | 60~79 | 80~100 |
|---|---|---|---|---|---|
| PRIORITY 1 (HIGH) | NO DIVISION | NO DIVISION | NO DIVISION | NO DIVISION | NO DIVISION |
| PRIORITY 2 (MEDIUM) | NO DIVISION | NO DIVISION | DIVIDE IN 2 | DIVIDE IN 3 | DIVIDE IN 4 |
| PRIORITY 3 (LOW) | NO DIVISION | DIVIDE IN 4 | DIVIDE IN 8 | DIVIDE IN 16 | DIVIDE IN 32 |

FIG. 7

| COMMAND | PROCESSING SIZE | TYPE | PRIORITY | SSD BUSY RATE | PROCESSING SIZE AFTER DIVISION |
|---|---|---|---|---|---|
| A | 2 BLOCKS | 1 | 1 | 15 | 2 BLOCKS |
| B | 2 BLOCKS | 2 | 2 | 15 | 2 BLOCKS |
| C | 8 BLOCKS | 3 | 3 | 15 | 8 BLOCKS |
| D | 2 BLOCKS | 1 | 1 | 50 | 2 BLOCKS |
| E | 2 BLOCKS | 2 | 2 | 50 | 1 BLOCK × 2 |
| F | 8 BLOCKS | 3 | 3 | 50 | 1 BLOCK × 8 |
| G | 2 BLOCKS | 1 | 1 | 50 | 2 BLOCKS |
| ... | ... | ... | ... | ... | ... |

FIG. 10

STORAGE CONTROL APPARATUS AND STORAGE CONTROL METHOD

CROSS-REFERENCE TO RELATED APPLICATION

This application is based upon and claims the benefit of priority of the prior Japanese Patent Application No. 2015-226502, filed on Nov. 19, 2015, the entire contents of which are incorporated herein by reference.

FIELD

The present embodiments discussed herein are related to a storage control apparatus and a storage control method.

BACKGROUND

The processor in a computer typically accesses a storage apparatus by issuing commands to the storage apparatus. In some configurations, commands are temporarily stored in a queue.

As one example, the technology described below relating to a storage apparatus including a disk memory and a flash memory has been proposed. With this storage apparatus, commands received from a host system are inputted into a primary queue, and commands in the queue that are directed at a flash memory are further stored in a flash queue before being outputted to a flash controller.

As one example of an access control technology for a storage apparatus, the disc control apparatus described below that performs write control according to a plurality of disk drives using a "write-after" arrangement has also been proposed. This disc control apparatus assigns a high priority to a disk drive that is a candidate for a destaging process and is the target of a direct access request from a host computer, and when selecting the disk drive to be subjected to the next destaging process, preferentially selects a disk drive with high priority.

See, for example, the following documents:
Japanese Laid-open Patent Publication No. 2015-130150; and
Japanese Laid-open Patent Publication No. 04-4422.

However, access processes whose execution is requested by a processor using commands may include both high-priority processes and low-priority processes. Here, the higher the priority of an access process, the sooner the access process should be executed. However, with a configuration where commands are temporarily registered in a queue and then issued to a storage apparatus, there is the problem that when a large number of commands for low-priority access processes are present in the queue in front of a command for a high-priority access process, it takes a long time before the command for the high-priority access process is issued.

There are also configurations where a queue is provided at the storage apparatus itself. As one example, commands transmitted from a processor are first stored in a queue at the storage apparatus. A command is fetched from the start of the queue and an access operation in keeping with the fetched command is executed. However with this configuration also, when a command for a high-priority access process is transmitted to the storage apparatus in a state where a large number of commands for low-priority access processes remain in the queue in the storage apparatus, it can take a long time before the high-priority access process is executed.

SUMMARY

According to one aspect, there is provided a storage control apparatus including a processor configured to perform a procedure including: determining, when an access process has been requested for a storage apparatus, an access priority showing a priority of the requested access process; registering an entry corresponding to the requested access process in a queue corresponding to the determined access priority out of a plurality of queues that are each provided for a different access priority; checking the plurality of queues at intermittent check timing; fetching, at each check timing, one entry from each queue, out of the plurality of queues, in which entries are registered; and instructing the storage apparatus to execute access processes corresponding to the fetched entries.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 7 depicts an example of the correspondence between combinations of priority and access load and the number of parts used when dividing;

FIG. 10 depicts examples of commands issued from a cache control unit;

DESCRIPTION OF EMBODIMENTS

Figure 1:
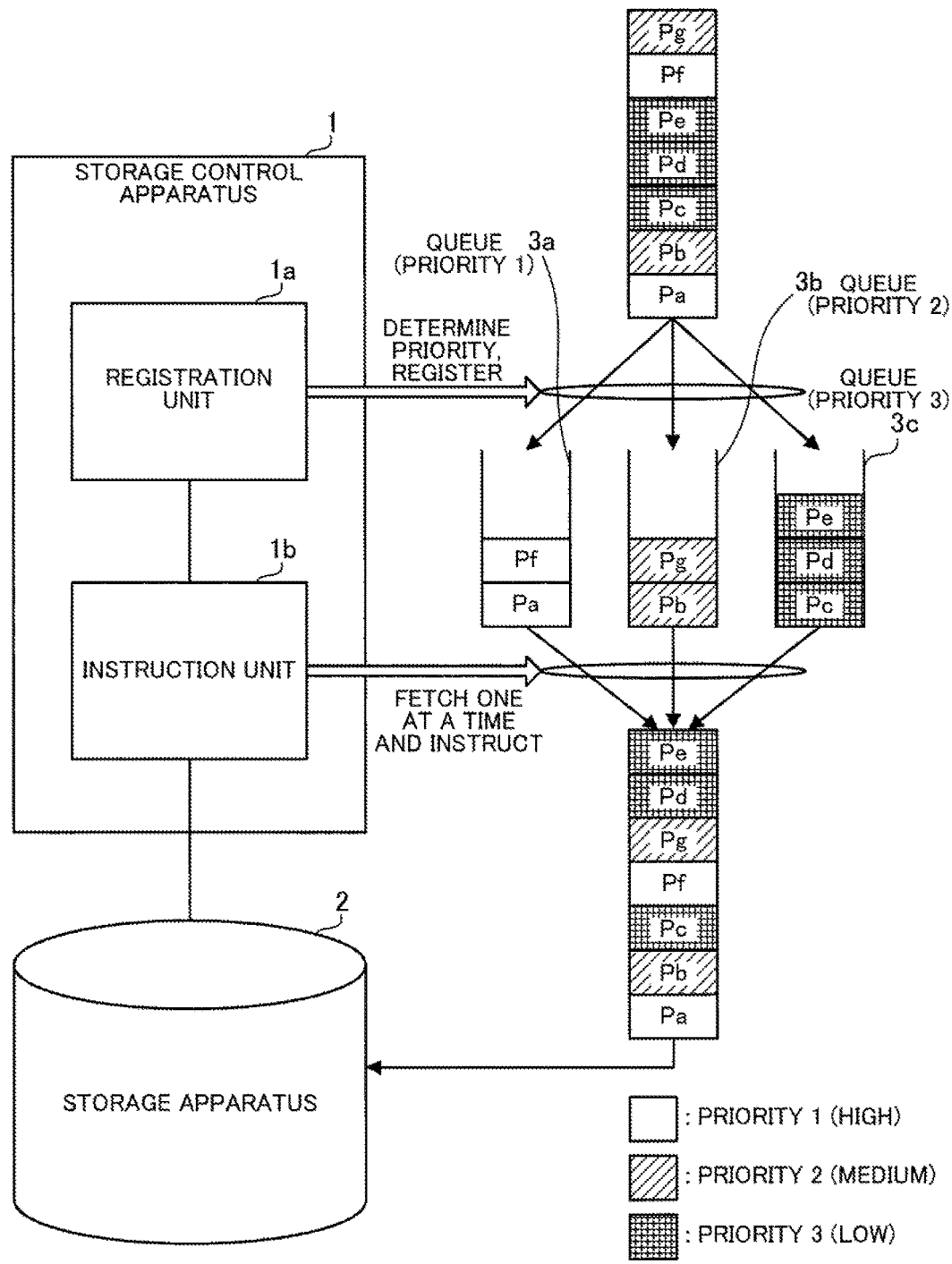
FIG. 1 depicts an example configuration and example processing of a storage control apparatus according to a first embodiment.

Several embodiments will be described below with reference to the accompanying drawings, wherein like reference numerals refer to like elements throughout.

First Embodiment

FIG. 1 depicts an example configuration and example processing of a storage control apparatus according to a first embodiment. The storage control apparatus 1 depicted in FIG. 1 includes a registration unit 1a and an instruction unit 1b. As one example, the processing of the registration unit 1*a* and the instruction unit 1*b* is realized by a processor provided in the storage control apparatus 1 executing a predetermined program. A storage apparatus 2 is connected to the storage control apparatus 1. Note that the storage apparatus 2 may be internally provided in the storage control apparatus 1.

When an access process for the storage apparatus has been requested, the registration unit 1*a* executes the following process. Note that as one example, the access process is requested by processing by an application running in the storage control apparatus 1. Alternatively, the access process may be requested from an apparatus outside the storage control apparatus 1.

The registration unit 1*a* determines the priority of the requested access process. The registration unit 1*a* has a plurality of queues respectively provided for different priorities, and registers an entry corresponding to the requested access process in the queue which corresponds to the determined priority. As one example, the registered entry is a command for requesting the corresponding access process.

In the example in FIG. 1, three queues numbered 3*a* to 3*c* are provided in the storage control apparatus 1. The queue 3*a* is associated with "priority 1" that is the highest priority. The queue 3*b* is associated with "priority 2" that is a medium priority. The queue 3*c* is associated with "priority 3" that is the lowest priority.

In the example in FIG. 1, it is assumed that the access processes Pa, Pb, Pc, Pd, Pe, Pf, and Pg have been requested in that order. It is also assumed that the priority of the access processes Pa and Pf is priority 1, the priority of the access processes Pb and Pg is priority 2, and the priority of the access processes Pc, Pd, and Pe is priority 3.

In this example, requests corresponding to the access process Pa and the access process Pf are registered in that order in the queue 3*a*, requests corresponding to the access process Pb and the access process Pg are registered in that order in the queue 3*b*, and requests corresponding to the access process Pc, the access process Pd, and the access process Pe are registered in that order in the queue 3*c*.

The instruction unit 1*b* checks the queues 3*a* to 3*c* with intermittent check timing. As one example, the check timing is timing at which it is possible to instruct the storage apparatus 2 to execute an access process, and as a specific example, is timing at which the number of access processes for which execution has been requested to the storage apparatus 2 but whose execution has not been completed falls to a certain number or below.

At each check timing, the instruction unit 1*b* fetches entries one at a time from queues, out of the queues 3*a* to 3*c*, in which entries are registered. By doing so, as a maximum, the same number of entries as the number of queues are fetched at each check timing. The instruction unit 1*b* instructs the storage apparatus 2 to execute access processes corresponding to the fetched entries. As one example, the fetched entries are transmitted to the storage apparatus 2 and are stored in a queue provided in the storage apparatus 2.

In the example in FIG. 1, this processing by the instruction unit 1*b* fetches the entries corresponding to the respective access processes in the order Pa, Pb, Pc, Pf, Pg, Pd, and Pe. By doing so, when a plurality of access processes with priority 1 are requested, the access processes are reordered so that at least one out of three access processes to be executed has priority 1.

As one example, the position in the execution order at the storage apparatus 2 of the access process Pf with priority 1 is changed to a position before the access processes Pd and Pe that were requested to the registration unit 1*a* before the access process Pf. As a result, compared to a case where the storage apparatus 2 is instructed to execute access processes with the same order as the order in which the processes were requested to the registration unit 1*a*, there is a reduction in the time from the requesting of the access process Pf to execution by the storage apparatus 2.

According to the storage control apparatus 1 described above, it is possible to reduce execution delays for high-priority access processes.

Second Embodiment

Next, a storage system with a secondary cache that uses an SSD (Solid State Drive) will be described as an example of the storage apparatus 2 in FIG. 1.

Figure 2:
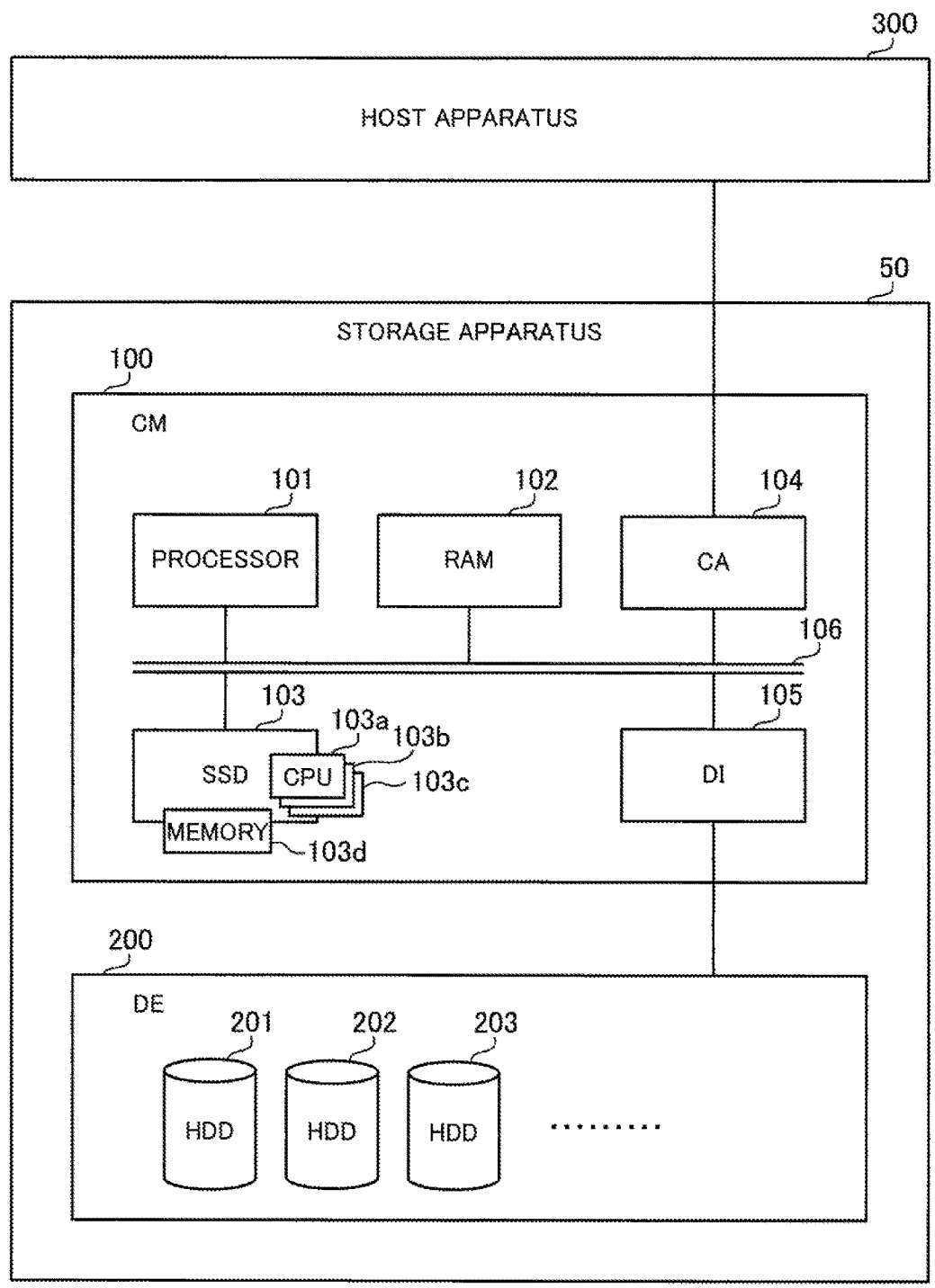
FIG. 2 depicts an example configuration of a storage system according to a second embodiment.

FIG. 2 depicts an example configuration of a storage system according to a second embodiment. The storage system depicted in FIG. 2 has a storage apparatus 50. The storage apparatus 50 has a controller module (CM) 100 and a drive enclosure (DE) 200. A host apparatus 300 is connected to the controller module 100. As one example, the controller module 100 and the host apparatus 300 are connected via a SAN (Storage Area Network) using a fibre channel, iSCSI (Internet Small Computer System Interface), or the like.

The controller module 100 is a storage control apparatus that controls access to storage devices mounted in the drive enclosure 200 in accordance with requests from the host apparatus 300. A plurality of storage devices that are accessed from the host apparatus 300 are housed in the drive enclosure 200. As one example in the present embodiment, the drive enclosure 200 is a disk array apparatus that houses a plurality of hard disk drives (HDDs) 201, 202, 203, . . . as the storage devices.

The controller module 100 includes a processor 101, a RAM (Random Access Memory) 102, an SSD 103, a channel adapter (CA) 104 and a drive interface (DI) 105. These component elements are connected via a bus 106.

The processor 101 is in overall control of the entire controller module 100. The processor 101 may be a multi-processor. As examples, the processor 101 may be a CPU (Central Processing Unit), an MPU (Micro Processing Unit), a DSP (Digital Signal Processor), an ASIC (Application Specific Integrated Circuit), or a PLD (Programmable Logic Device). The processor 101 may also be a combination of two or more of a CPU, an MPU, a DSP, an ASIC, and a PLD.

The RAM 102 is used as the main storage apparatus of the controller module 100. At least part of an operating system (OS) program and an application program to be executed by the processor 101 is temporarily stored in the RAM 102. Various data used in processing by the processor 101 is also stored in the RAM 102. As one example, a region is reserved in the RAM 102 for a primary cache used during access control to the drive enclosure 200 performed in accordance with requests from the host apparatus 300.

The SSD 103 is used as an auxiliary storage apparatus of the controller module 100. The SSD 103 stores the OS program, application programs, and various data. A region in the SSD 103 is also reserved for a secondary cache used during access control to the drive enclosure 200 performed in accordance with requests from the host apparatus 300. The SSD 103 is equipped with three CPUs 103*a* to 103*c*, which control access to internal storage regions, and a volatile memory 103*d*.

The channel adapter 104 is an interface for communicating with the host apparatus 300. The drive interface 105 is an interface for communicating with the drive enclosure 200. As one example, the drive interface 105 is a SAS (Serial Attached SCSI) interface.

The processing functions of the controller module 100 are realized by the hardware configuration described above.

Figure 3:
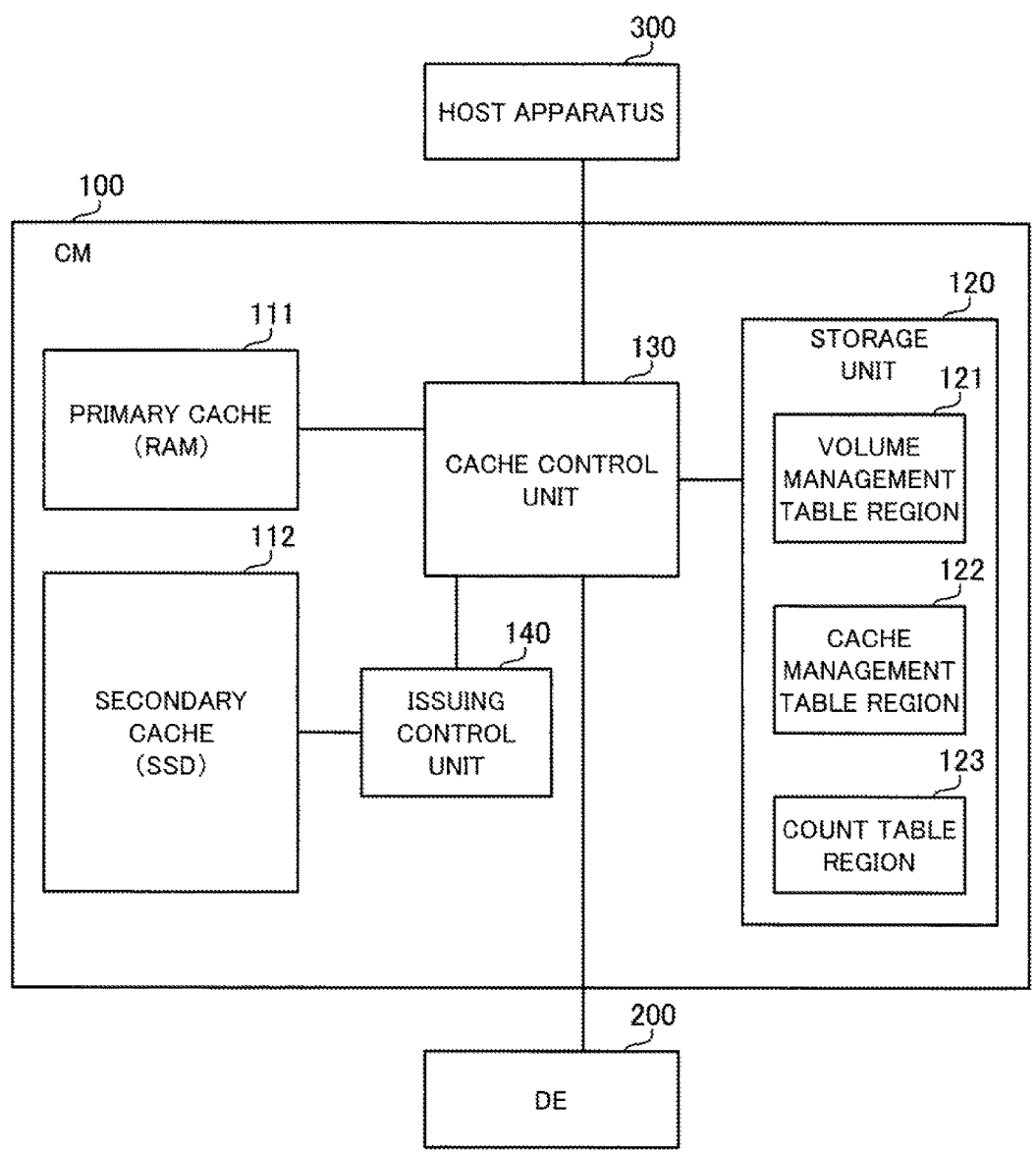
FIG. 3 is a block diagram depicting an example configuration of the processing functions of a controller module.

FIG. 3 is a block diagram depicting an example configuration of the processing functions of the controller module 100. The controller module 100 includes a primary cache 111, a secondary cache 112, a storage unit 120, a cache control unit 130, and an issuing control unit 140.

The primary cache 111 and the secondary cache 112 are used as cache regions when accessing the drive enclosure 200 in accordance with access requests from the host apparatus 300. The secondary cache 112 is realized as a storage region reserved in a storage apparatus with higher access performance than the storage devices (HDDs) in the drive enclosure 200, and in the present embodiment is realized as a storage region reserved in the SSD 103. Note that the SSD in which the storage region of the secondary cache 112 is reserved may be a different SSD to the SSD that stores the OS program and application programs. The primary cache 111 is realized as a storage region reserved in a storage apparatus with higher access performance than the storage apparatus that realizes the secondary cache 112, and in the present embodiment is realized as a storage region reserved in the RAM 102.

The storage unit 120 is realized as a storage region in the RAM 102 or the SSD 103, for example. The storage unit 120 includes a volume management table region 121, a cache management table region 122, and a count table region 123, and stores information of various tables.

A volume management table stores information relating to logical volumes to be accessed from the host apparatus 300. The expression "logical volume" refers to a logical storage region realized by any HDD in the drive enclosure 200.

A cache management table stores information for managing data stored in the primary cache 111 and the secondary cache 112, out of the data on the logical volumes. As one example, the cache management table holds, for each region in the primary cache 111 and the secondary cache 112, identification information of blocks that are stored in a region out of the blocks in a logical volume, last access times for the blocks, and the like.

The count table stores identification information of blocks, out of the blocks in a logical volume, that have been expelled at least once from the primary cache 111 and the number of times the respective blocks have been expelled. When a new block is to be stored in the primary cache 111 in accordance with an access request from the host apparatus 300 but there is no free space in the primary cache 111, the block with the oldest final access time out of the blocks stored in the primary cache 111 is deleted. In this specification, the expression "expelled from the primary cache 111" refers to a block stored in the primary cache 111 being deleted in this way.

As one example, the processing of the cache control unit 130 and the issuing control unit 140 are realized by the processor 101 executing a predetermined program.

The cache control unit 130 uses the primary cache 111 and the secondary cache 112 to control access to a logical volume in accordance with a request from the host apparatus 300. The processing using the primary cache 111 and the secondary cache 112 will be described in detail later.

The issuing control unit 140 receives access requests for the secondary cache 112 from the cache control unit 130 and controls the timing at which the secondary cache 112 is instructed to execute an access process in accordance with the request. More specifically, the issuing control unit 140 receives a command for accessing the secondary cache 112 from the cache control unit 130 and controls the issue timing of the received command to the secondary cache 112. As described later, the issuing control unit 140 rearranges the issue order of the received commands in accordance with the priorities of the access processes based on the commands.

Processing by the cache control unit 130 that uses the primary cache 111 and the secondary cache 112 will now be described.

When data for which a read has been requested from the host apparatus 300 is stored in the primary cache 111, the cache control unit 130 reads the data from the primary cache 111 and transmits the data to the host apparatus 300. Also, when data for which a read has been requested from the host apparatus 300 is not stored in the primary cache 111, the cache control unit 130 determines whether the data is stored in the secondary cache 112.

When the data is stored in the secondary cache 112, the cache control unit 130 reads the data from the secondary cache 112, stores the data in the primary cache 111, and then transmits the data to the host apparatus 300. On the other hand, when the data is not stored in the secondary cache 112, the cache control unit 130 reads the data from the drive enclosure 200, stores the data in the primary cache 111, and then transmits the data to the host apparatus 300.

When updating of data stored in the primary cache 111 is requested from the host apparatus 300, the cache control unit 130 updates the data in the primary cache 111 using received data and then carries out a write-back at asynchronous timing. During the write-back, corresponding data in the drive enclosure 200 is updated using the received data. At this time, when the same data is also stored in the secondary cache 112, the data in the secondary cache 112 is also updated using the received data.

When new data is to be stored in the primary cache 111 but there is no free space in the primary cache 111, the cache control unit 130 expels the data with the oldest final access time out of the data stored in the primary cache 111 from the primary cache 111. The cache control unit 130 registers the number of times each block has been expelled from the primary cache 111 in a count table 123a. Based on the count table 123a, the cache control unit 130 reads out a block that has been expelled from the primary cache 111 more than a predetermined number of times from the drive enclosure 200 and stores the block in the secondary cache 112. Hereinafter a read of data from the drive enclosure 200 into the secondary cache 112 is referred to as "staging". A staging process based on the number of times a block has been expelled is based on the idea that data that has been expelled many times has a high probability of access being requested again from the host apparatus 300 at a later timing, and is one type of so-called "prefetching". Note that out of the count numbers held in the count table 123a, a count number corresponding to a block that has been staged into the secondary cache 112 is reset to zero.

Figure 4:
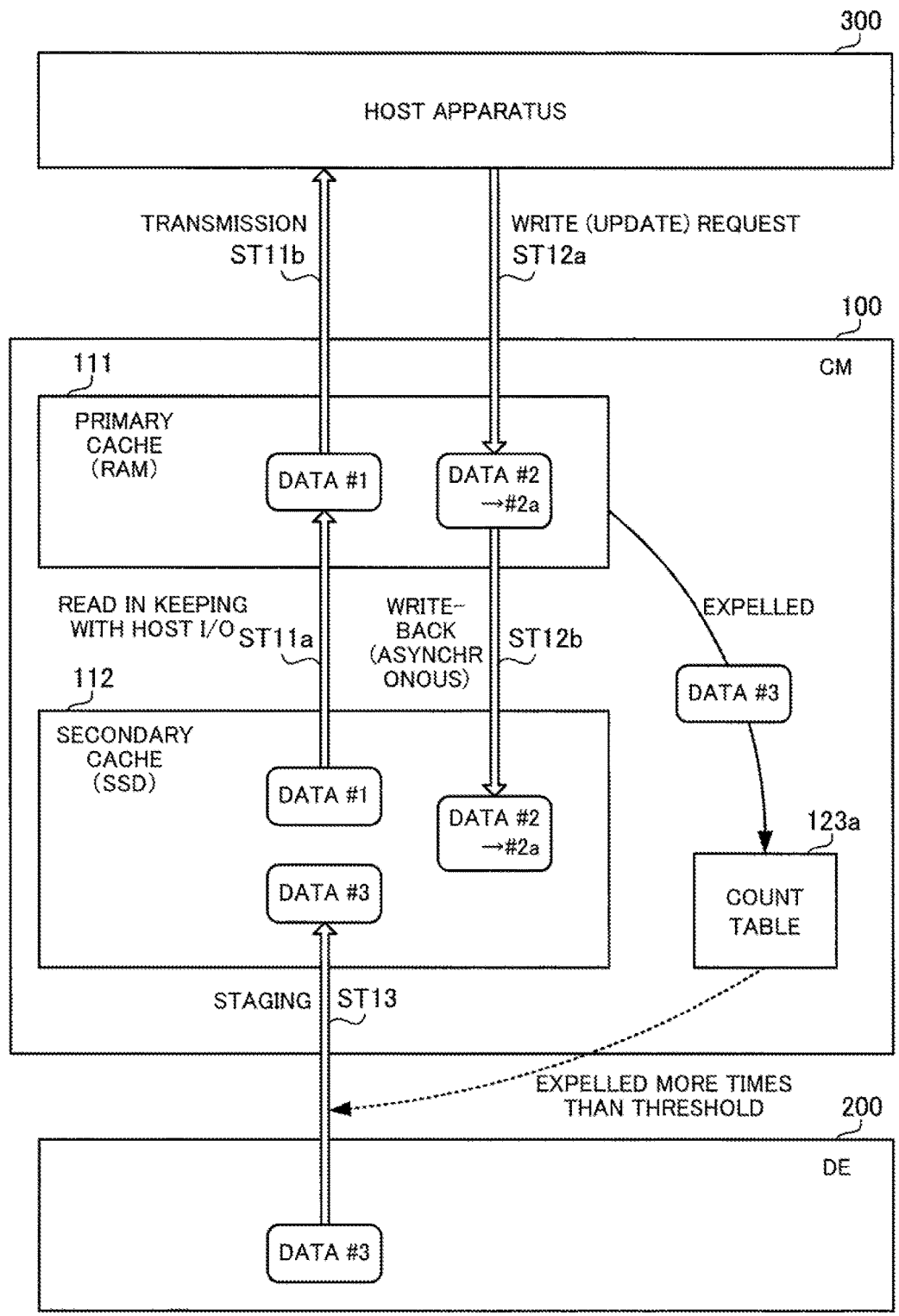
FIG. 4 depicts access to a secondary cache.

FIG. 4 depicts access to the secondary cache. Out of the processing described above that uses the primary cache 111 and the secondary cache 112, the focus here is on access to the secondary cache 112. Access processes to the secondary cache 112 are roughly classified into the following three types. Note that the expression "host I/O (In/Out)" indicates an access request from the host apparatus 300.

(Type 1) An access process in keeping with host I/O.
(Type 2) An access process that is asynchronous with host I/O.
(Type 3) An access process that is unrelated to host I/O.

One example of a type 1 access process is a read of data from the secondary cache 112 into the primary cache 111 in keeping with a read request from the host apparatus 300. This process is executed when data for which a read has been requested from the host apparatus 300 is not stored in the primary cache 111, but is stored in the secondary cache 112.

FIG. 4 depicts a process (step ST11a) that reads out data#1 from the secondary cache 112 into the primary cache 111 as an example of the processing described above. Note that data#1 is transmitted to the host apparatus 300 after being stored in the primary cache 111 (step ST11b).

A type 2 access process is a process that relates to a host I/O but is carried out asynchronously with the host I/O. One example of this type of access process is a write-back from the primary cache 111 to the secondary cache 112. A write-back is a process executed when updating from the host apparatus 300 has been requested for data stored in both the primary cache 111 and the secondary cache 112 and overwrites the data in the primary cache 111 using the updating data and then overwrites the corresponding data in the secondary cache 112 at asynchronous timing using the updating data.

FIG. 4 depicts processing when data#2 is updated to data#2a as an example of the processing described above. The host apparatus 300 transmits a write request for updating the data#2 at a certain position in the logical volume to data#2a (step ST12a). The cache control unit 130 updates the data#2 in the primary cache 111 to the data#2a. At any timing after a write complete reply has been sent to the host apparatus 300, the cache control unit 130 performs a write-back that updates the data#2 in the secondary cache 112 to the data#2a (step ST12b).

Staging from an HDD in the drive enclosure 200 into the secondary cache 112 is one example of a type 3 access process. This staging is executed based on the count table 123a for data that has been expelled from the primary cache 111 more than a predetermined threshold, i.e., a predetermined number of times. FIG. 4 depicts staging (step ST3) of the data#3 as one example of this process.

Out of the type 1 to type 3 access processes described above, it is desirable for the execution of the type 1 access process to be completed in as short a time as possible from the issuing of the host I/O. This is because when time is taken to complete an access process, the time taken to reply to the host apparatus 300 increases, causing a drop in access performance for the logical volumes. For this reason, type 1 access processes have a higher priority than type 2 and 3 access processes. On the other hand, since type 3 access processes are unrelated to the timing at which host I/O is issued, type 3 access processes can be said to have low priority compared to type 1 and 2 access processes.

In this way, to improve access performance from the host apparatus 300 to the logical volumes, it is important to complete type 1 access processes in a short time. However, the commands that are issued from the cache control unit 130 to the secondary cache 112 include a mix of commands that request the different types of access processes. In addition, the data to be written or read out by these access processes have different sizes. This means when a command for requesting a type 1 access process is issued from the cache control unit 130, there are cases where the start of the type 1 access process is delayed due to the time taken by access processes based on commands that were issued earlier. As a result, time is taken to reply to the host apparatus 300.

Figure 5:
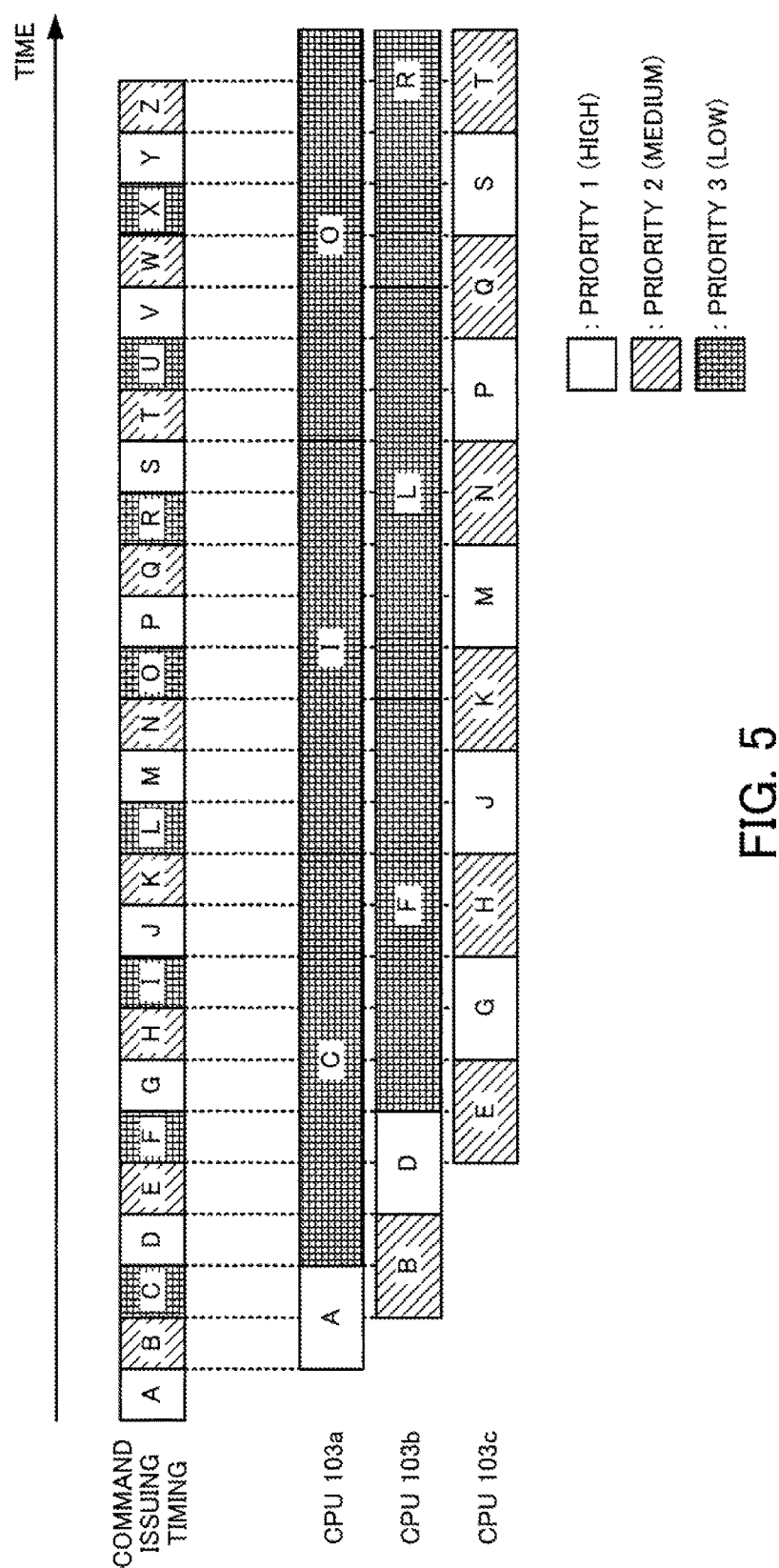
FIG. 5 is a timing chart depicting a comparative example for the time taken from the issuing of a command to the completion of a corresponding access process.

A comparative example depicted in FIG. 5 will now be described for a case where the above problem occurs. FIG. 5 is a timing chart depicting a comparative example for the time taken from the issuing of a command to the completion of a corresponding access process.

In the comparative example in FIG. 5, it is assumed that a command issued from the cache control unit 130 is directly transmitted to the secondary cache 112 without passing via the issuing control unit 140. Also, as depicted in FIG. 2, three CPUs 103a to 103c are provided in the SSD 103. It is also assumed that an SSD queue that temporarily stores commands issued from the cache control unit 130 is provided in the memory 103d of the SSD 103, and that the CPUs 103a to 103c are capable of executing access to the secondary cache 112 in parallel based on commands read out from the SSD queue.

Note that in FIG. 5, the length in the left-right direction of the rectangles that are positioned to the right of "CPU 103a, CPU 103b, CPU 103c" and correspond to the respective commands depicts the length of processing. It is assumed here that as one example, the length of the processing is proportional to the size of the data to be accessed (more specifically, the size of the read data or the write data). Hereinafter, the size of the data to be accessed is sometimes referred to as the "processing size".

In the example in FIG. 5, it is assumed that commands A to Z for requesting access to the secondary cache 112 are issued in that order from the cache control unit 130 to the secondary cache 112. Out of these commands, the commands A, D, G, J, M, P, S, V, and Y request type 1 access processes and the priority of the access processes is the highest value of "1". The commands B, E, H, K, N, Q, T, W, and Z request type 2 access processes and the priority of the access processes is the middle value of "2". The commands C, F, I, L, O, R, U, and X request type 3 access processes and the priority of the access processes is the lowest value of "3".

When command A is issued, the CPU 103a starts an access process based on command A and when command B is issued, the CPU 103b starts an access process based on command B. Also, when command C is issued, since the access process based on command A has been completed, the CPU 103a starts an access process based on command C. After this, command D is executed by the CPU 103b and command E is executed by the CPU 103c.

In the example in FIG. 5, command A to command G are executed by one of the CPUs 103a to 103c immediately after being issued. However, since the processing sizes of the access processes based on commands C and F that were issued earlier are large, there is an interval between the issuing and execution of command H. In addition, since the processing sizes of the access processes based on the later commands I, L, O, and R are also large, the delay between issuing and execution of commands from command I onwards gradually increases.

As one example, if it is assumed that commands are issued at regular cycles, the time equivalent to four cycles is taken from the issuing of command S with priority 1 to the start of the access process based on command S. Accordingly, there is a large drop in response for the access request corresponding to command S from the host apparatus 300.

As depicted in the example in FIG. 5 described above, in a heavy-load state where one or more access processes with a large processing size have not been completed, there is the risk that a long time will be taken from the issuing of a command with priority 1 to the start of execution of an access process based on the command. In particular, in the present embodiment, although the processing sizes of type 1 and type 2 access processes are variable in single block units, the processing size of type 3 access processes is a fixed size of a plurality of blocks. One reason for this is that since the secondary cache 112 has a larger capacity than the primary cache 111, the amount of staged data is increased to raise the probability of a hit. Another reason is that when staged data is read from an HDD, it is more efficient to read data in large amounts.

Due to these conditions over processing sizes, access processes based on commands with priority 3 are more likely to have a large processing size than access processes based on commands with priorities 1 and 2. This means that the start timing of access processes based on commands with priority 1 are susceptible to delays as described above.

In addition, regardless of the processing sizes, when a large number of low-priority commands have been consecutively issued to the secondary cache 112, delays may occur for the start timing of access processes based on commands with priority 1.

For this reason, in the present embodiment, the issuing control unit 140 assigns commands issued from the cache control unit 130 to different priority-based queues, fetches commands one at a time from the respective queues, and issues the commands to the secondary cache 112. By doing so, the order in which commands are issued to the secondary cache 112 is changed so that commands with priority 1 are issued with a certain interval as a minimum. As a result, the length of execution delays for commands with priority 1 and the probability of execution delays occurring are reduced.

The issuing control unit 140 also divides the processing size of an access process based on a command with low priority to convert the command into a plurality of converted commands that the issuing control unit 140 registers in a queue. By doing so, the length of execution delays for commands with priority 1 and the probability of execution delays occurring are reduced even when access processes whose priority is low and whose processing sizes are large are requested.

Figure 6:
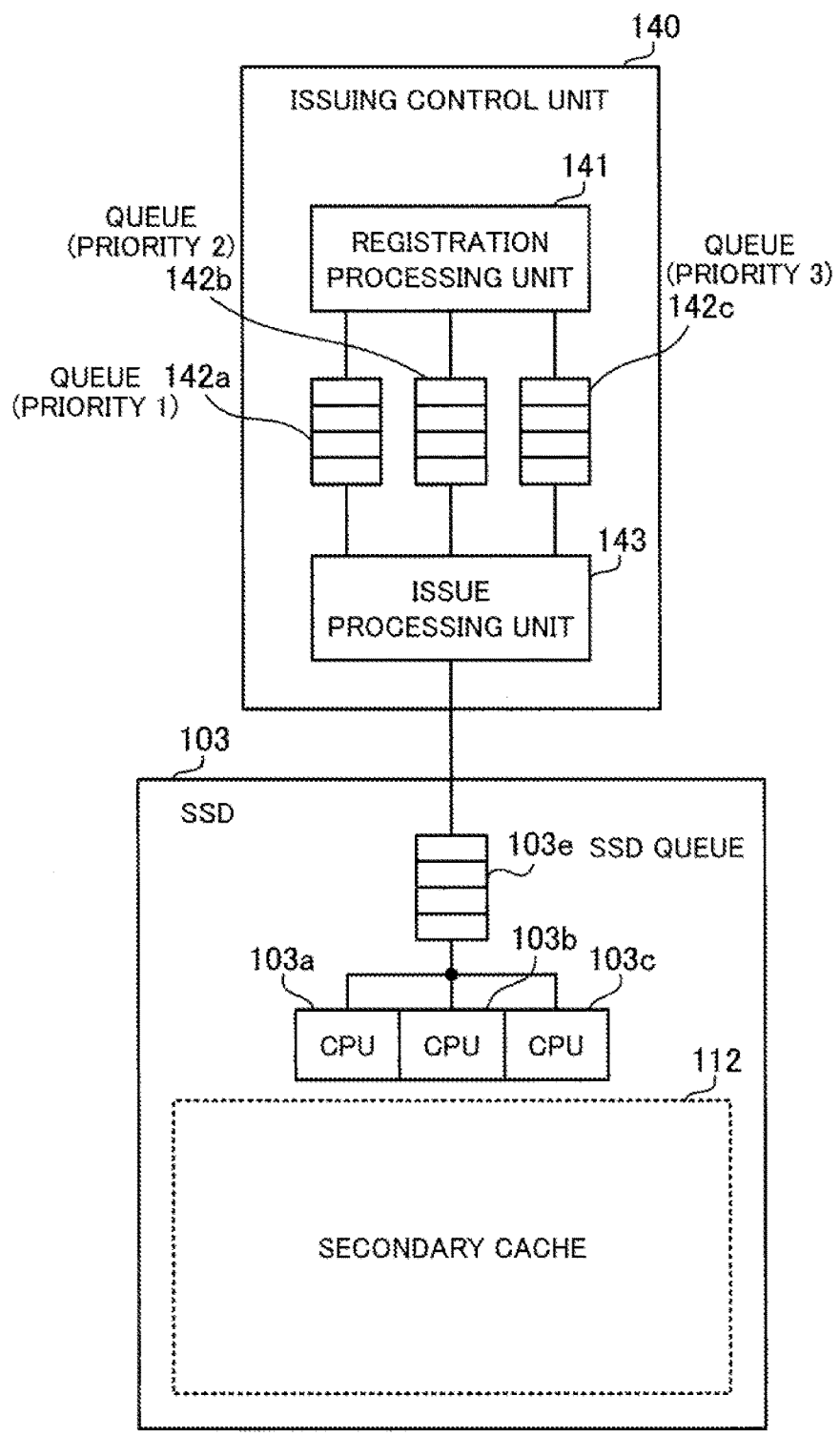
FIG. 6 depicts an example of the internal configuration of an issuing control unit and an SSD.

FIG. 6 depicts an example of the internal configuration of the issuing control unit and the SSD. The issuing control unit 140 has a registration processing unit 141, queues 142a to 142c, and an issue processing unit 143.

Commands are temporarily stored according to a FIFO (First In First Out) method in the respective queues 142a to 142c. The queues 142a to 142c are realized by management information for commands stored in the RAM 102, for example. The queue 142a is associated with priority 1, the queue 142b is associated with priority 2, and the queue 142c is associated with priority 3.

The registration processing unit 141 receives a command issued from the cache control unit 130 and determines the priority of the access process corresponding to the received command. The registration processing unit 141 also detects the access load of the secondary cache 112 at the time when the command is received. The access load is detected as the disk busy rate of the SSD 103, for example. The registration processing unit 141 decides the number of parts into which an access process is to be divided based on the priority and the access load.

When the number of parts is decided as one (that is, the process is not to be divided), the registration processing unit 141 registers the received command in the queue corresponding to the determined priority out of the queues 142a to 142c.

On the other hand, when the number of parts is decided as two or more, the registration processing unit 141 divides the processing size of an access process based on the received command uniformly into the decided number of parts. The registration processing unit 141 generates a number of commands equal to the number of parts, and sets information for carrying out a write or read of data of the processing size after division in each command. The registration processing unit 141 registers the plurality of commands obtained by converting the original command in this way in a queue corresponding to the determined priority out of the queues 142a to 142c.

The issue processing unit 143 determines whether it is possible to issue commands to the secondary cache 112. As one example, issue processing unit 143 determines that it is possible to issue commands when, out of the commands that have already been issued to the secondary cache 112, the number of commands whose access processes are incomplete is equal to or below a threshold. On determining that it is possible to issue commands, the issue processing unit 143 fetches commands one at a time from each queue, out of the queues 142a to 142c, in which at least one command is registered and issues the fetched command to the secondary cache 112.

On the other hand, the SSD 103 has an SSD queue 103e. The SSD queue 103e temporarily stores commands issued from the issuing control unit 140 to the secondary cache 112 according to a FIFO method. As one example, the SSD queue 103e is realized in the memory 103d provided in the SSD 103.

The CPUs 103a to 103c provided in the SSD 103 execute access processes to the secondary cache 112 based on commands fetched from the SSD queue 103e. On completing the execution of an access process, the CPUs 103a to 103c fetch the command registered at the front of the SSD queue 103e. The CPUs 103a to 103c are capable of executing access processes to the secondary cache 112 in parallel based on the fetched commands.

FIG. 7 depicts an example of the correspondence between combinations of priority and access load and the number of parts into which an access process is to be divided. In this example, it is assumed that the access load is detected as the disk busy rate (SSD busy %) of the SSD 103.

As one example, the registration processing unit 141 decides the number of parts into which an access process is to be divided based on a number-of-divisions correspondence table 124 depicted in FIG. 7. The number-of-divisions correspondence table 124 is stored in the storage unit 120 for example and is referred to by the registration processing unit 141.

As depicted in the example of the number-of-divisions correspondence table 124 in FIG. 7, the registration processing unit 141 sets the number of parts into which an access process is to be divided higher the lower the priority of the access process. As a result, an access process with low priority and a large processing load is divided into a plurality of access processes with small processing sizes and commands corresponding to the access processes produced by the division are registered in the low-priority queue. By dividing an original command into a plurality of commands in this way, it is possible for a high-priority access process to be executed so as to interrupt the execution of access processes based on original commands. Accordingly, access processes with high priority are preferentially executed first. As a result, it is possible to reduce the length of execution delays for access processes with high priority and the probability of execution delays occurring.

The registration processing unit 141 increases the number of parts into which an access process is to be divided the larger the access load. When the access load of a process is large, delays from the issuing of other commands from the cache control unit 130 to the start of access processes based on the commands is likely to increase compared to when the access load is small. This means that by increasing the number of parts into which an access process is to be divided as the access load increases, it is possible to reduce the length of execution delays for high-priority access processes and the probability of execution delays occurring. On the other hand, in a state where the access load is small and an execution delay is unlikely to occur for access processes, by reducing the number of parts into which an access process is to be divided, the access processing efficiency at the secondary cache 112 is improved.

Note that when an access process is divided, it is desirable for the access size after division to be an integer multiple of the minimum unit for reads and writes of the SSD 103. By doing so, it is possible to improve the efficiency of accesses to the secondary cache 112.

Next, the processing of the controller module 100 will be described with reference to a flowchart.

Figure 8:
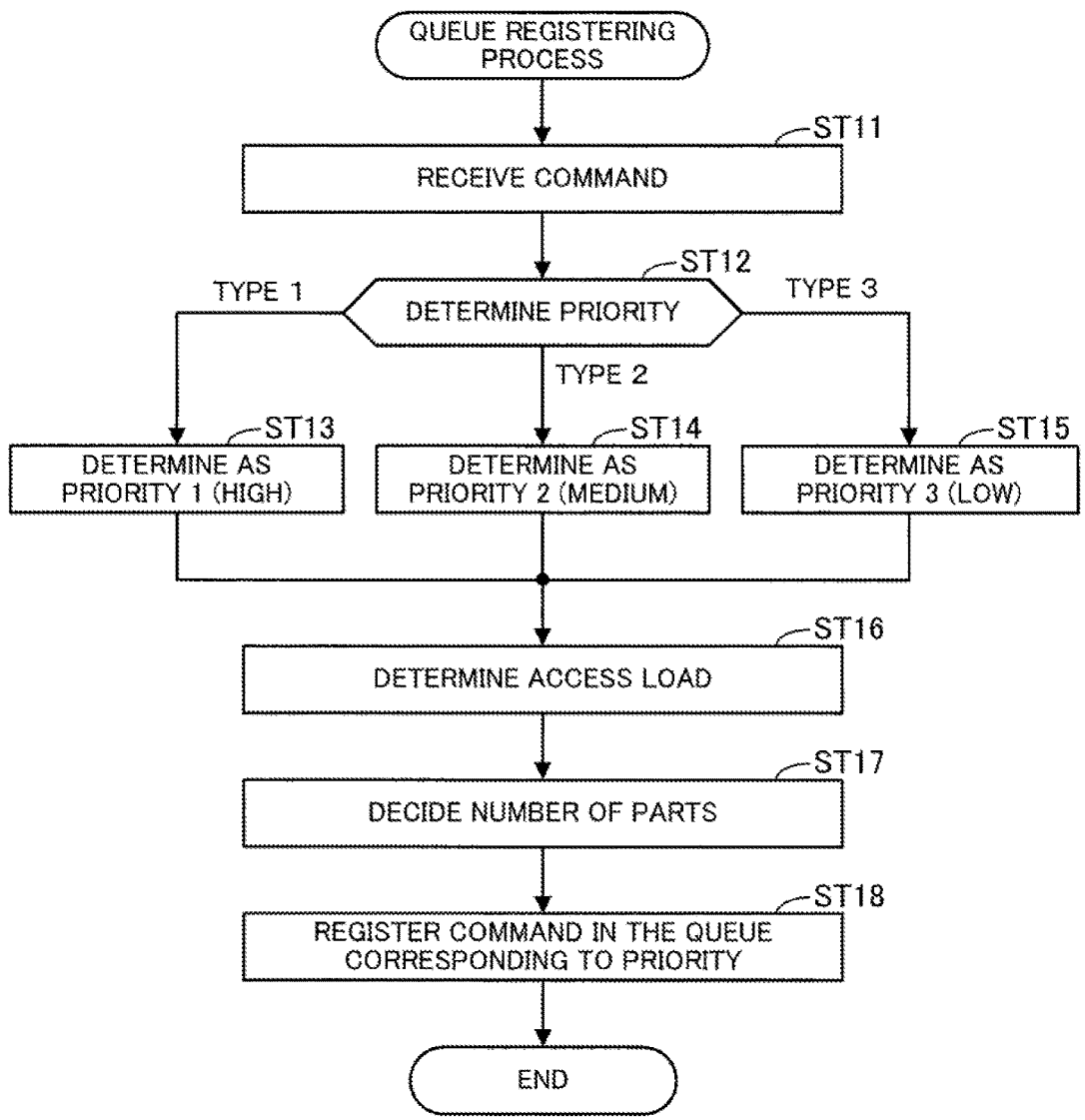
FIG. 8 is a flowchart depicting one example of a queue registering process by a registration processing unit.

FIG. 8 is a flowchart depicting one example of a queue registering process by the registration processing unit.

(Step ST11) On receiving a command for accessing the secondary cache 112 from the cache control unit 130, the registration processing unit 141 executes the processing from step ST12 onwards. Note that the registration processing unit 141 also receives, together with the command, information showing the type of access process based on the command from the cache control unit 130.

(Step ST12) The registration processing unit 141 determines the priority of the access process based on the type of access process based on the received command. The registration processing unit 141 performs a determination like that in step ST13 for type 1, performs a determination like that in step ST14 for type 2, and performs a determination like that in step ST15 for type 3.

(Step ST13) The registration processing unit 141 determines that the priority is priority 1.

(Step ST14) The registration processing unit 141 determines that the priority is priority 2.

(Step ST15) The registration processing unit 141 determines that the priority is priority 3.

(Step ST16) The registration processing unit 141 determines the access load at the secondary cache 112. As one example, the registration processing unit 141 detects the SSD busy rate as an index indicating the access load. Note that as another example index indicating the access load, it is possible to use the total number of commands accumulated in the queues 142*a* to 142*c*.

(Step ST17) The registration processing unit 141 decides the number of parts into which an access process is to be divided based on the priority determined in one of steps ST13 to ST15 and the access load determined in step ST16. This decision is carried out by referring to the number-of-divisions correspondence table 124 depicted in FIG. 7, for example.

(Step ST18) When the decided number of parts is one, the registration processing unit 141 registers the command received in step ST11 in the queue corresponding to the determined priority out of the queues 142*a* to 142*c*. On the other hand, when the decided number of parts is two or more, the registration processing unit 141 divides the processing size of an access process based on the command received in step ST11 uniformly into the decided number of parts. The registration processing unit 141 generates a number of commands equal to the number of parts and sets information for carrying out a write or read of data of the processing size after division in each command. The registration processing unit 141 registers the plurality of commands obtained by converting the original command in this way in the queue corresponding to the determined priority out of the queues 142*a* to 142*c*.

Figure 9:
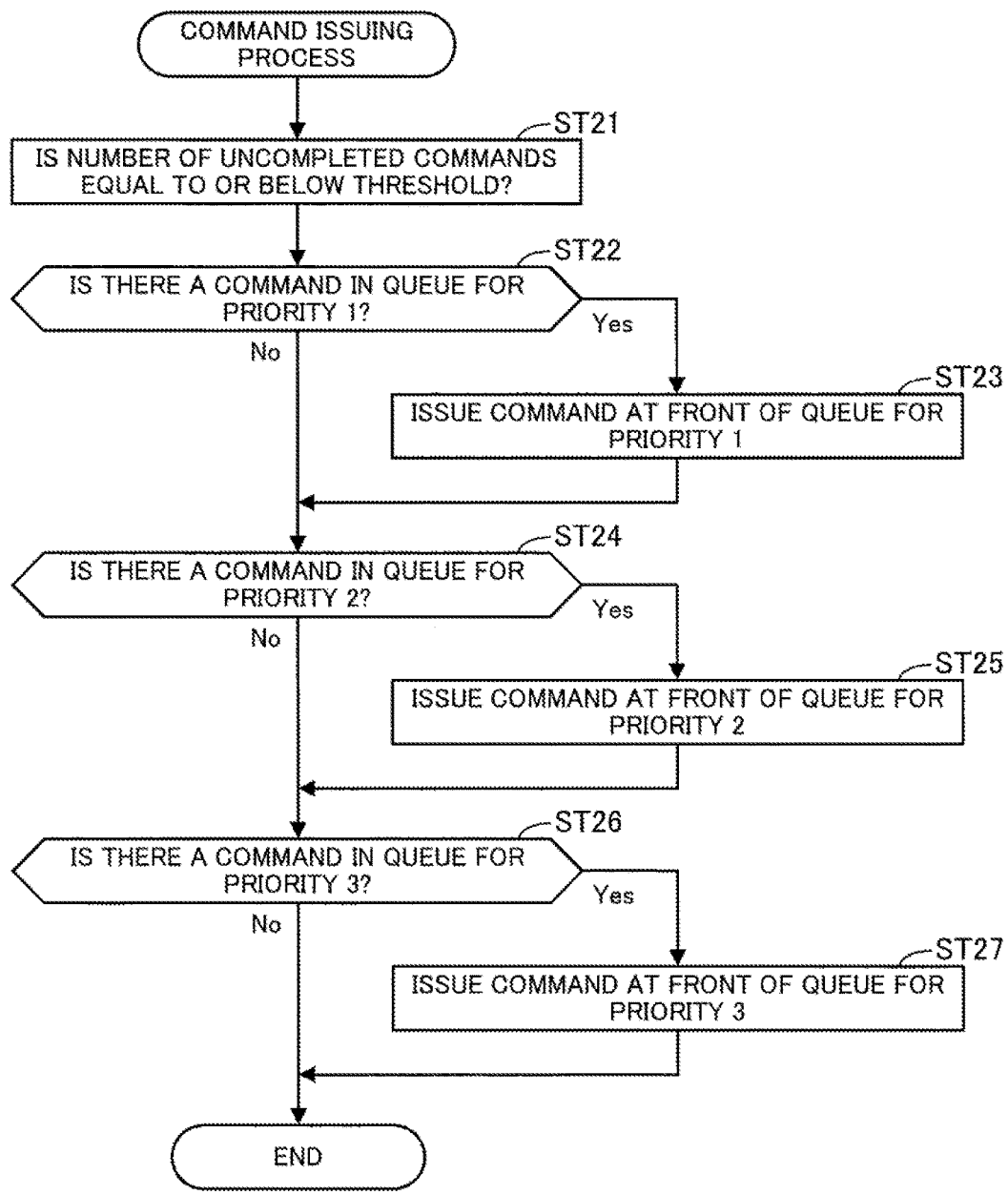
FIG. 9 is a flowchart depicting an example procedure of a command issuing process by an issue processing unit.

FIG. 9 is a flowchart depicting an example procedure of a command issuing process by the issue processing unit.

(Step ST21) When the number of commands, out of the commands that have been issued to the secondary cache 112, for which the access processes are yet to be completed is equal to or below a predetermined threshold, the issue processing unit 143 executes the processing in step ST22 onwards. As an alternative example, the issue processing unit 143 may execute the processing in step ST22 onwards when the number of commands stored in the SSD queue 103*e* is a predetermined threshold or below.

(Step ST22) The issue processing unit 143 determines whether a command is stored in the queue 142 corresponding to priority 1. When a command is stored, the issue processing unit 143 advances to step ST23, while when a command is not stored, the issue processing unit 143 advances to step ST24.

(Step ST23) The issue processing unit 143 fetches a command stored at the front of the queue 142*a* and issues the fetched command to the SSD 103. The issued command is stored in the SSD queue 103*e*.

(Step ST24) The issue processing unit 143 determines whether a command is stored in the queue 142*b* corresponding to priority 2. When a command is stored, the issue processing unit 143 advances to step ST25, while when a command is not stored, the issue processing unit 143 advances to step ST26.

(Step ST25) The issue processing unit 143 fetches the command stored at the front of the queue 142*b* and issues the fetched command to the SSD 103. The issued command is stored in the SSD queue 103*e*.

(Step ST26) The issue processing unit 143 determines whether a command is stored in the queue 142*c* corresponding to priority 3. When a command is stored, the issue processing unit 143 advances to step ST27, while when a command is not stored, the issue processing unit 143 ends the processing.

(Step ST27) The issue processing unit 143 fetches the command stored at the front of the queue 142*c* and issues the fetched command to the SSD 103. The issued command is stored in the SSD queue 103*e*.

Next, a specific example of the issuing of commands will be described.

FIG. 10 depicts examples of commands issued from the cache control unit 130. In the example in FIG. 10, it is assumed that commands A to G are issued in that order from the cache control unit 130. The commands A, D, and G request type 1 access processes and have a processing size of two blocks. The commands B and E request type 2 access processes and have a processing size of two blocks. The commands C and F request type 3 access processes and have a processing size of eight blocks.

In the period in which the commands A to C are issued, the SSD busy rate is 15%. During this period, access processes based on the commands A to C are not divided. On the other hand, in the period in which the commands D to G are issued, the SSD busy rate increases to 50%. During this period, the access process based on the command E is divided into two access processes that each have a processing size of one block, and the access process based on the command F is divided into eight access processes that each have a processing size of one block.

Figure 11:
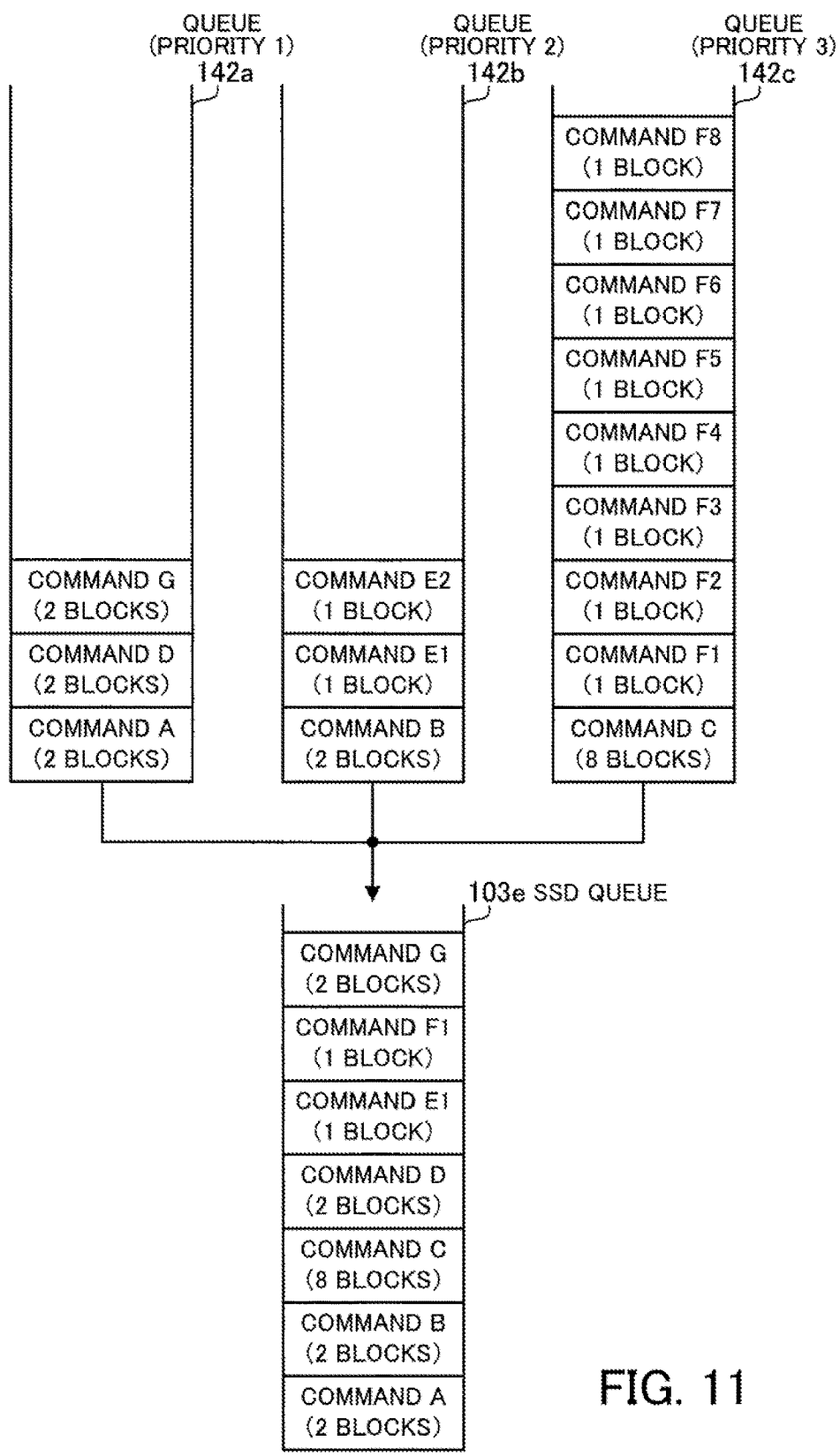
FIG. 11 depicts an example of storage of commands in queues.

FIG. 11 depicts an example of storage of commands in queues. FIG. 11 depicts the queues 142a to 142c and the SSD queue 103e when commands have been issued as depicted in FIG. 10.

However, FIG. 11 merely shows the order in which commands are stored in queues and does not depict which commands are stored at any given moment.

Also, in FIG. 11, commands E1 and E2 are commands generated by dividing the access process based on the command E and commands F1 to F8 are commands generated by dividing the access process based on the command F.

Commands are stored in the queue 142a in the order command A, command D, command G. Commands are stored in the queue 142b in the order command B, command E1, command E2. Commands are stored in the queue 142c in the order command C, command F1, command F2, command F3, command F4, command F5, command F6, command F7, command F8.

Next, processing by the issue processing unit 143 stores the commands A, B, C, D, E1, F1, G, . . . in that order in the SSD queue 103e. When the order in which the commands are stored is compared with the order in which the commands are issued from the cache control unit 130, commands E and F between command D and command G are changed to commands E1 and F1 that have a small processing size. By doing so, the time taken by the access processes based on commands issued before the command G is reduced and as a result, it is possible to reduce the length of an execution delay for the command G and the probability of execution delay occurring.

Figure 12:
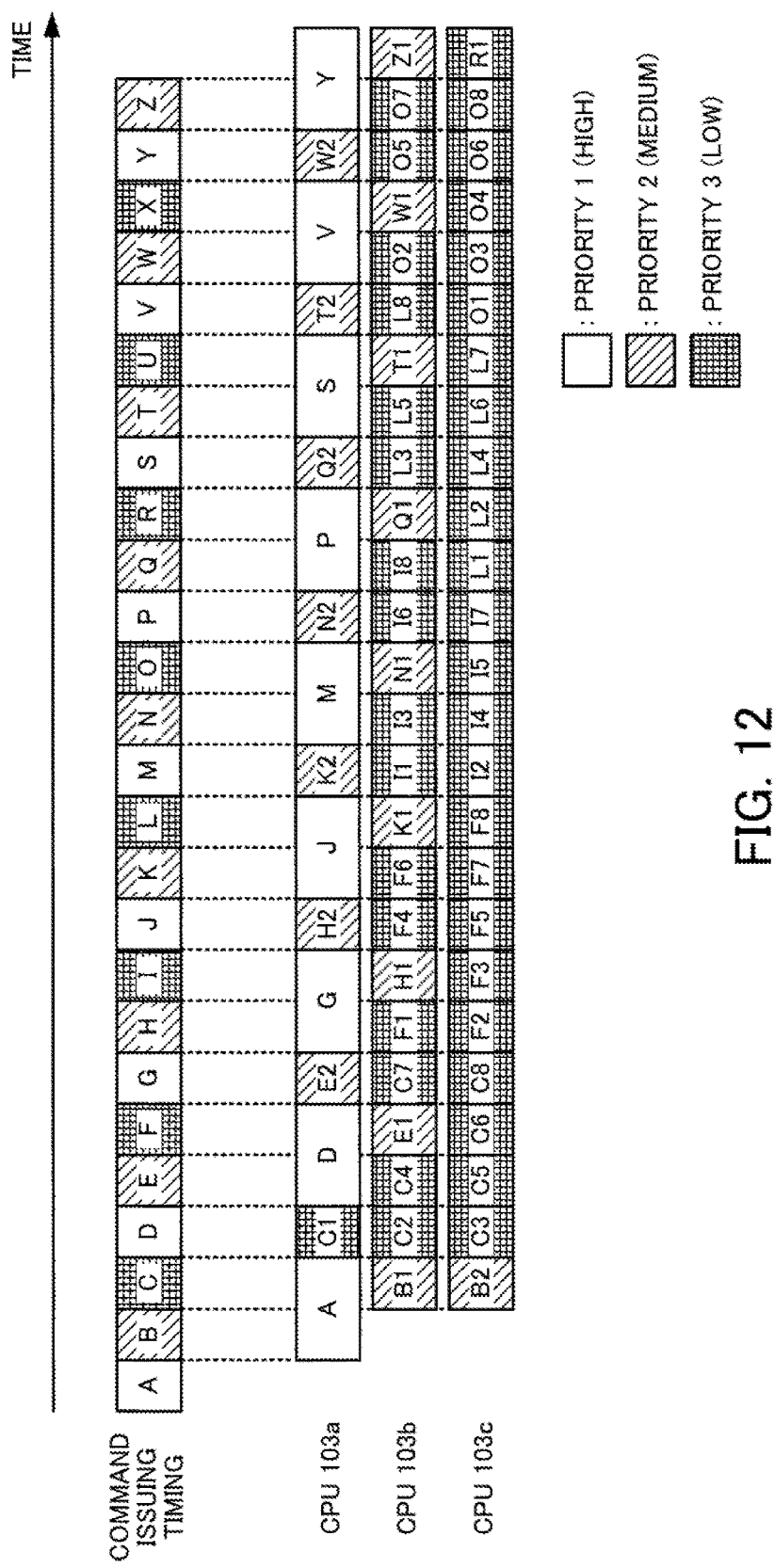
FIG. 12 is a timing chart depicting an example of how time passes from the issuing of a command to completion of the corresponding access process.

FIG. 12 is a timing chart depicting an example of how time passes from the issuing of a command to completion of the corresponding access process. In the example in FIG. 12, it is assumed that the same commands A to Z as in FIG. 5 are issued in that order from the cache control unit 130.

Also, in FIG. 12, it is assumed that the SSD busy rate is 50% for the entire period where the commands A to Z are issued. For this reason, the command B is converted to commands B1 and B2, the command E is converted to commands E1 and E2, the command H is converted to commands H1 and H2, the command K is converted to commands K1 and K2, the command N is converted to commands N1 and N2, the command Q is converted to commands Q1 and Q2, the command T is converted to commands T1 and T2, the command W is converted to commands W1 and W2, and the command Z is converted to commands Z1 and Z2. However, the command Z2 is not illustrated.

Also, the command C is converted to commands C1 to C8, the command F is converted to commands F1 to F8, the command I is converted to commands I1 to I8, the command L is converted to commands L1 to L8, the command O is converted to commands O1 to O8, the command R is converted to commands R1 to R8, the command U is converted to commands U1 to U8, and the command X is converted to commands X1 to X8. However, the commands R2 to R8, U1 to U8, and X1 to X8 are not illustrated.

In this way, low-priority access processes are divided into a plurality of access processes with small processing sizes. The order of execution of access processes is then changed so that high-priority access processes are executed between the divided access processes. As a result, the high-priority access processes become less susceptible to execution delays.

As one example, in FIG. 5, the time equivalent to four cycles is taken from the issuing of the command S with priority 1 to the start of the access process based on the command S. On the other hand, in the example in FIG. 12, when the command S is issued, the access process based on the command S is started immediately. Accordingly, the response to the access request corresponding to command S from the host apparatus 300 is greatly improved.

Note that the processing functions of the apparatuses (the storage control apparatus 1 and the controller module 100) in the embodiments described above can be realized by a computer. When doing so, a program in which the processing content of the functions to be provided by the apparatuses is written is provided. By having the program executed by a computer, the processing functions described above are realized by the computer. A program in which the processing content is written can be recorded on a computer-readable recording medium. A magnetic storage apparatus, an optical disc, a magneto-optical recording medium, and a semiconductor memory can be given as examples of a computer-readable recording medium. The magnetic storage apparatus may be a hard disk drive (HDD), a flexible disk, or a magnetic tape. DVD (Digital Versatile Disc), DVD-RAM, CD-ROM (Read Only Memory), CD-R (Recordable) and CD-RW (Rewritable) are all examples of optical discs. An MO (Magneto-Optical) disc is one example of a magneto-optical recording medium.

When the program is distributed, as one example portable recording media such as DVDs or CD-ROMs on which the program is recorded may be sold. It is also possible to store the program in a storage apparatus of a server computer and to transfer the program from the server computer via a network to another computer.

For example, the computer that executes the program stores the program recorded on a portable recording medium or the program transferred from a server computer into its own storage apparatus. The computer reads the program from its own storage apparatus and executes processing in accordance with the program. Note that the computer is also capable of directly reading the program from the portable recording medium and executing processing in accordance with the program. It is also possible for a computer to execute processing in accordance with a received program every time a program is transferred from a server computer connected via a network.

According to the present embodiments, it is possible to reduce execution delays for high-priority access processes to a storage apparatus.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A storage control apparatus comprising a processor configured to perform a procedure including:
   determining, when an access process has been requested for a storage apparatus, an access priority showing a priority of the requested access process;
   dividing the requested access process into parts in keeping with the determined access priority;

registering the parts, produced by the dividing, into entries of a priority queue out of a plurality of priority queues according to the determined access priority, wherein each of the plurality of priority queues being provided for each different access priority;

checking the plurality of priority queues at intermittent check timing;

fetching, at each check timing, a leading entry from each of the plurality of priority queues; and instructing the storage apparatus to execute access processes corresponding to the fetched leading entries in fetched order from the plurality of priority queues.

2. The storage control apparatus according to claim 1, wherein the registering includes:

detecting an access load at the storage apparatus when the access priority is determined.

3. The storage control apparatus according to claim 1, further comprising a primary cache used when a host apparatus accesses another storage apparatus, wherein the storage apparatus is a secondary cache used when the host apparatus accesses said another storage apparatus.

4. The storage control apparatus according to claim 3, wherein the determining includes determining the access priority when a process that reads a first data from the secondary cache is requested in response to a read request from the host apparatus for the first data that is not stored in the primary cache as a higher priority than the access priority when a process that writes second data from said another storage apparatus into the secondary cache is requested.

5. The storage control apparatus according to claim 4, wherein the second data is data that has been expelled from the primary cache more than a predetermined number of times.

6. A storage control method comprising:

determining, by a computer and when an access process has been requested for a storage apparatus, an access priority showing a priority of the requested access process;

dividing, by the computer, the requested access process into parts in keeping with the determined access priority;

registering the parts, produced by the dividing, into entries of a priority queue out of a plurality of priority queues according to the determined access priority, wherein each of the plurality of priority queues being provided for each different access priority;

checking, by the computer, the plurality of priority queues at intermittent check timing;

fetching, by the computer and at each check timing, a leading entry from each of the plurality of priority queues; and instructing, by the computer, the storage apparatus to execute access processes corresponding to the fetched leading entries in fetched order from the plurality of priority queues.

7. A non-transitory computer-readable storage medium storing a storage control program that causes a computer to perform a procedure comprising:

determining, when an access process has been requested for a storage apparatus, an access priority showing a priority of the requested access process;

dividing in the requested access process into parts in keeping with the determined access priority;

registering the parts, produced by the dividing, into entries of a priority queue out of a plurality of priority queues according to the determined access priority, wherein each of the plurality of priority queues being provided for each different access priority;

checking the plurality of priority queues at intermittent check timing;

fetching, at each check timing, a leading entry from each of the plurality of priority queues in order; and instructing the storage apparatus to execute access processes corresponding to the fetched leading entries in fetched order from the plurality of priority queues.

* * * * *